(12) United States Patent
Root et al.

(10) Patent No.: US 7,073,753 B2
(45) Date of Patent: Jul. 11, 2006

(54) INTEGRATED TRAIN CONTROL

(75) Inventors: Kevin B. Root, Black River, NY (US); Bryan M. McLaughlin, Watertown, NY (US); Dale R. Stevens, Adams Center, NY (US); Jon M. Marra, Henderson, NY (US); Stephen K. Nickles, Burleson, TX (US); Michael J. Hawthorne, Arlington, TX (US)

(73) Assignee: New York Airbrake Corporation, Watertown, NY (US)

( * ) Notice: Subject to any disclaimer, the term of this patent is extended or adjusted under 35 U.S.C. 154(b) by 71 days.

(21) Appl. No.: 10/344,633

(22) PCT Filed: Sep. 7, 2001

(86) PCT No.: PCT/US01/28120

§ 371 (c)(1),
(2), (4) Date: Feb. 14, 2003

(87) PCT Pub. No.: WO02/22425

PCT Pub. Date: Mar. 21, 2002

(65) Prior Publication Data

US 2003/0183729 A1    Oct. 2, 2003

Related U.S. Application Data

(63) Continuation of application No. 09/397,676, filed on Sep. 16, 1999, now Pat. No. 6,334,654, and a continuation-in-part of application No. 09/254,638, filed on Nov. 23, 1999, now Pat. No. 6,098,006, which is a continuation-in-part of application No. PCT/US98/23766, filed on Nov. 10, 1998.

(60) Provisional application No. 60/065,064, filed on Nov. 10, 1997, provisional application No. 60/026,039, filed on Sep. 13, 1996.

(51) Int. Cl.
*B61L 21/00* (2006.01)
*B60T 13/00* (2006.01)

(52) U.S. Cl. .............................................. 246/72; 303/7

(58) Field of Classification Search ................. 246/72, 246/167 R, 182 A, 182 B, 182 C, 182 R; 303/7
See application file for complete search history.

(56) References Cited

U.S. PATENT DOCUMENTS

| 3,519,805 A | 7/1970 | Thorne-Booth |
| 4,005,838 A | 2/1977 | Grudy |
| 4,041,283 A | 8/1977 | Moiser |

(Continued)

FOREIGN PATENT DOCUMENTS

DE    196 45 426 A1    5/1997

(Continued)

OTHER PUBLICATIONS

Database WPI, Section PQ, Week 9751, Derwent ZPublications Ltd., London, GB; Class Q18 AN 97-550428, no date.

*Primary Examiner*—S. Joseph Morano
*Assistant Examiner*—Robert J. McCarry, Jr.
(74) *Attorney, Agent, or Firm*—Barnes & Thornburg LLP

(57) ABSTRACT

An integrated train control system (FIGS. 1 and 6) is a combination of systems including: EP-60 (FIG. 2) CCBII (FIG. 3), Wired DP (FIG. 4), and LEADER (FIG. 5). The integrated train control system (FIG. 6) includes a master controller (MMI) cooperating with features of EP-60, CCBII, LEADER, and Wired DP to control car control devices (CCD) through ITC network.

8 Claims, 6 Drawing Sheets

U.S. PATENT DOCUMENTS

| | | |
|---|---|---|
| 4,041,470 A | 8/1977 | Slane et al. |
| 4,042,810 A | 8/1977 | Mosher |
| 4,181,943 A | 1/1980 | Mercer, Sr. et al. |
| 4,279,395 A | 7/1981 | Boggie et al. |
| 4,344,364 A | 8/1982 | Nickles et al. |
| 4,401,035 A | 8/1983 | Spigarelli et al. |
| 4,561,057 A | 12/1985 | Haley, Jr. et al. |
| 4,602,335 A | 7/1986 | Perlmutter |
| 4,652,057 A | 3/1987 | Engle et al. |
| 4,735,385 A | 4/1988 | Nickles et al. |
| 4,794,548 A | 12/1988 | Lynch et al. |
| 4,827,438 A | 5/1989 | Nickles et al. |
| 4,835,693 A * | 5/1989 | Smith et al. .................. 701/70 |
| 4,853,883 A | 8/1989 | Nickles et al. |
| 5,083,274 A | 1/1992 | Bezos et al. |
| 5,109,343 A | 4/1992 | Budway |
| 5,172,316 A | 12/1992 | Root et al. |
| 5,185,700 A | 2/1993 | Bezos et al. |
| 5,369,587 A * | 11/1994 | Root et al. .................... 701/70 |
| 5,487,516 A * | 1/1996 | Murata et al. .......... 246/182 C |
| 5,538,331 A | 7/1996 | Kettle, Jr. |
| 5,590,042 A | 12/1996 | Allen, Jr. et al. |
| 5,630,565 A | 5/1997 | Lumbis |
| 5,647,562 A | 7/1997 | Lumbis et al. |
| 5,677,533 A * | 10/1997 | Yaktine et al. ............... 250/342 |
| 5,721,683 A | 2/1998 | Joyce, Jr. et al. |
| 5,744,707 A | 4/1998 | Kull |
| 5,758,299 A | 5/1998 | Sandborg et al. |
| 5,785,392 A | 7/1998 | Hart |
| 5,828,979 A | 10/1998 | Polivka et al. |
| 5,862,048 A | 1/1999 | Knight |
| 5,950,967 A | 9/1999 | Montgomery |
| 5,966,084 A * | 10/1999 | Lumbis et al. ............... 340/933 |
| 5,984,427 A * | 11/1999 | Kettle, Jr. .................... 303/16 |
| 6,002,978 A * | 12/1999 | Marra et al. .................. 701/70 |
| 6,049,296 A * | 4/2000 | Lumbis et al. ............... 340/933 |
| 6,098,006 A * | 8/2000 | Sherwood et al. ............ 701/70 |
| 6,144,901 A | 11/2000 | Nickles et al. |
| 6,334,654 B1 * | 1/2002 | Root et al. ..................... 303/7 |
| 6,648,422 B1 * | 11/2003 | Root et al. ..................... 303/7 |

FOREIGN PATENT DOCUMENTS

| | | |
|---|---|---|
| EP | 114 633 A1 | 8/1984 |
| EP | 257 662 A2 | 3/1988 |
| EP | 539 885 A2 | 5/1993 |
| EP | 755 840 A1 | 12/1997 |
| GB | 2188 464 | 9/1987 |

* cited by examiner

INTEGRATED TRAIN CONTROL

CROSS-REFERENCE

This is a continuation of U.S. patent application Ser. No. 09/397,676 filed Sep. 16, 1999 and now U.S. Pat. No. 6,334,654, which is a continuation-in-part of PCT/US98/23766 filed Nov. 10, 1998, which claims benefit of U.S. Provisional Patent Application Ser. No. 60/065,064 filed Nov. 10, 1997 and a continuation-in-part of U.S. patent application Ser. No. 09/254,638 filed Nov. 23, 1999 and now U.S. Pat. No. 6,098,006, which claims benefit of U.S. Provisional Patent Application Ser. No. 60/026,039 filed Sep. 13, 1996.

BACKGROUND AND SUMMARY OF THE INVENTION

The present invention relates generally to train control and more specifically to an integrated train control which integrates existing train control systems.

The various train control systems are available. For example, New York Air Brake Corporation (NYAB) offers products which enhance both information and productivity including EP-60® System, (Electronically Controlled Pneumatic Brake—ECP), CCBII® System (Computer Controlled Brake), Wired Distributed Power, Smart Car and LEADER® System. Each product alone offers value in both providing information and improving operational performance. Integrating the products together creates a complete train control system with synergistic value beyond the capability of any product alone.

To develop a complete integrated system for total train management, four basic functions are required. They being:

Man-Machine Interface—provides the mechanism to receive train control commands and provide system status feedback Enabler—provides the pathway and mechanism to control a function of the train Actuator—provides the means to physically create action within the train On-Board Intelligence—provides the decision making and information handling function for managing a train.

By establishing the EP-60 System as the foundation of the Integrated Train Control System, each system can be used as a unique building block. The Electronically Controlled Pneumatic System (ECP) provide the needed functionality for the ITC Network integrity, pertinent vehicle information, and gateway for trainline information transfer. With this, the backbone for Integrated Train Control System is established, providing the intelligence and enabler functions for the system.

Integrating EP-60 System with CCBII System creates a "Dual Mode" trainline brake control system for ECP or conventional pneumatic equipped rail cars, all through a common brake controller, operator display and local brake cylinder control devices. The CCBII function provides the man-machine interface and locomotive actuator functions for the Integrated Train Control System.

Wired DP integration provides a simplified distributed power system utilizing the existing EP-60 brake functions. System requirements, such as, trainline integrity, communications validation, and trainline brake control is provided by the EP-60 function. With this, distributed power's primary responsibility is to provide locomotive propulsion control while providing the man-machine interface and actuator functions of the integrated system.

Smart Car integration improves the train brake control through electronic on-car load sensing and brake effort monitoring. In this way, the car's brake control can be adjusted to achieve the desired brake rate. By utilizing the ITC Network, Smart Car also provides the capability for unique car control commands (i.e. automated handbrake, dumper control, etc.)

LEADER System becomes the system enabler to control and monitor the complete train. LEADER System adds the intelligence to each individual sub-system to achieve total train management. LEADER System interacts with the EP-60 and WDP systems to calculate a brake setting for each car and brake and throttle setting for each locomotive with in a train based on the geography of the situation to optimize train handling and fuel efficiency. The integrated system is also enhanced by LEADER System's interaction with Smart Car as a man-machine interface, as well as a communications platform. Based on information received from Smart Car, LEADER System acquires information of the conditions on the cars and provides the ability to alert the Locomotive Engineer and recommend a course of action related to the event. LEADER System also provides the means to relay the Smart Car information to a remote Base Station for further disposition.

An integrated train control system according to the present invention includes a wire trainline and a brake pipe extending through each car on the train. An electropneumatic brake controller controls the brake pipe and provides electropneumatic brake signals. The propulsion controller provides electrical propulsion signals. An operator interface is connected to the brake controller and the propulsion controller. An electropneumatic brake system in each of the cars in the train is connected to the trainline and brake pipe. Propulsion systems on the locomotive in the train are also connected to the trainline. A master controller determines the conditions for each car and locomotive in the train and as a function of predetermined conditions transmits over the trainline individualized brake signals to each car and locomotive and individualized propulsion signals to each locomotive.

The master controller determines the location of each car and locomotive on a track profile and determines the conditions of the cars and locomotives from the position on the track profile. The master controller also determines anticipated conditions of each car and locomotive based on upcoming track profiles and individualized the transmitted signals as a function of the anticipated conditions. The car brake controller and propulsion controller include sensors and the brake controller and the propulsion controller determines conditions from the sensor and transmits the predetermined condition to the master controller. The determined conditions could include one or more of hot bearings, stuck hand brakes, flat wheel, wheel off rail, etc. They may also include one or more of car load, braking effort, draw bar/draft gear forces, impact detection, etc. The brake controller uses the locally determined conditions. Wherein the car and locomotives includes auxiliary equipment connected to the brake controller or propulsion controller, the master controller transmits individual signals for the auxiliary equipment.

The resulting benefit of integrating these systems within a single system is well beyond the sum of their individual benefits alone. Additional performance and informational benefits are created.

Other objects, advantages and novel features of the present invention will become apparent from the following detailed description of the invention when considered in conjunction with the accompanying drawings.

DESCRIPTION OF THE PREFERRED EMBODIMENTS

Figure 1:
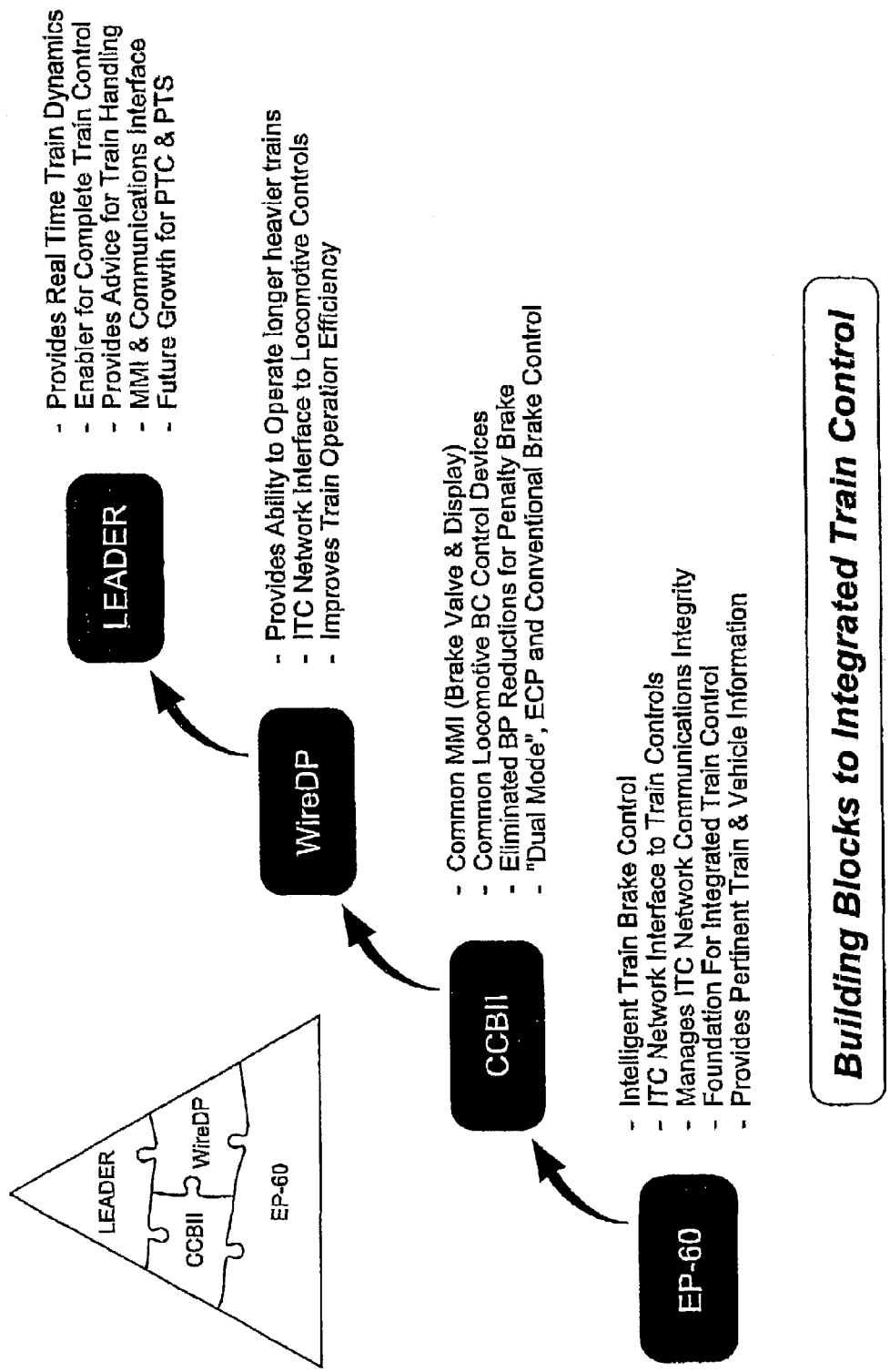
FIG. 1 is a diagram showing the building blocks in an integrated train control.

The building blocks for the integrated train control system of the present invention is illustrated in FIG. 1. Each of the subsystems will be described in detail and followed by the integration using the map of FIG. 1.

EP-60 System

Figure 2:
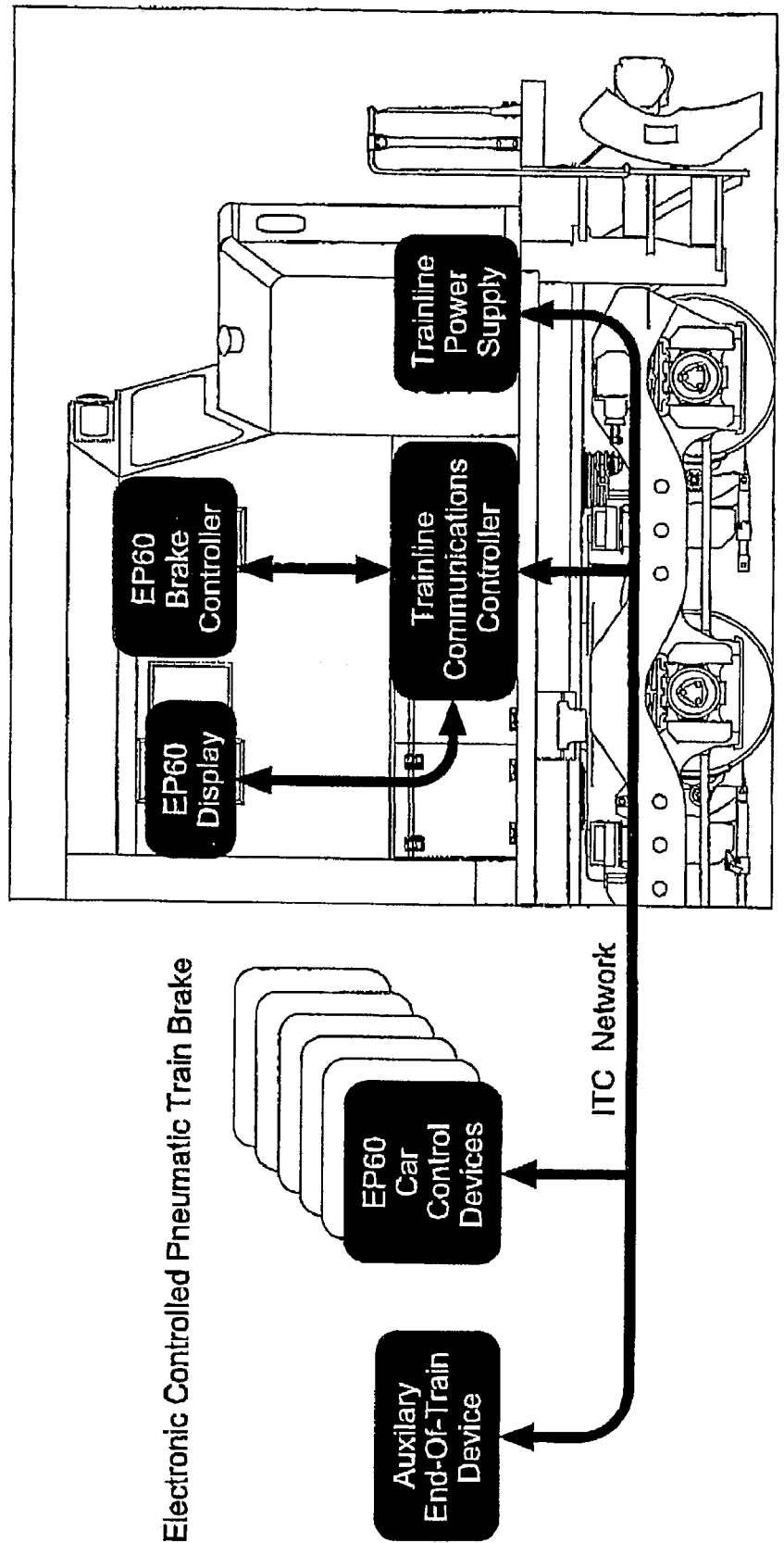
FIG. 2 shows a schematic representation of an EP-60 brake control system.

The EP-60® System is a communications network based electronic-pneumatic train brake control system and is illustrated in FIG. 2.

The EP-60 system consists of locomotive equipment, car braking equipment, an auxiliary end-of-train device, and a power/communications distribution system. The locomotive equipment collectively referred to as the Head-End-Unit (HEU), consists of a Trainline Power Supply (TPS), Trainline Communications Controller (TCC), Brake Controller and an Operator Interface Unit (OIU). The car equipment consists of the Car Control Device (CCD). Each locomotive and car also include an Identification Module (IDM). The following block diagram depicts the EP-60 system architecture. The car control device is described in U.S. Pat. No. 5,967,620 to Truglio et al. and U.S. Pat. No. 6,049,296 to Lumbis, et al.

The locomotive head-end unit (HEU) supplies power to and communicates with each of the car control devices (CCD) via the Intra-Train Communications (ITC) Network. The auxiliary end-of-train device (AED) provides termination of the communication line and transmits an end-of-train message back to the HEU for establishing trainline integrity. Trainline power and communications are transmitted on a single set of wires. The trainline communications network is based upon the Echelon Corporation's LonWorks® network technology.

Power to the car equipment is provided from the trainline power supply via trainline wires. Power from the trainline is used to charge on-car batteries, which in turn supply power for the brake control electronics and other car functions. A trainline network interface provides the communication link between the car and the rest of the train In ECP operation, brake pipe is not modulated for train brake control, but acts only as the air supply source to the train. The locomotive HEU interprets the Locomotive Engineer's actions and provides braking commands to each car via the ITC network. This network is also used for reporting car exceptions, status information, and diagnostics. The OIU provides train control status information.

The CCD provides normal EP service and emergency brake control. An emergency portion and/or vent valve is included for propagation of brake pipe pressure and brake cylinder (BC) control during a pneumatic initiated emergency brake. With special software, the CCD can be made to emulate the functions of the service portion (i.e. respond to conventional brake pipe control). In this mode, assuming that an on-board power source is available, the CCD will operate normally in a conventional train.

CCBII® System

Figure 3:
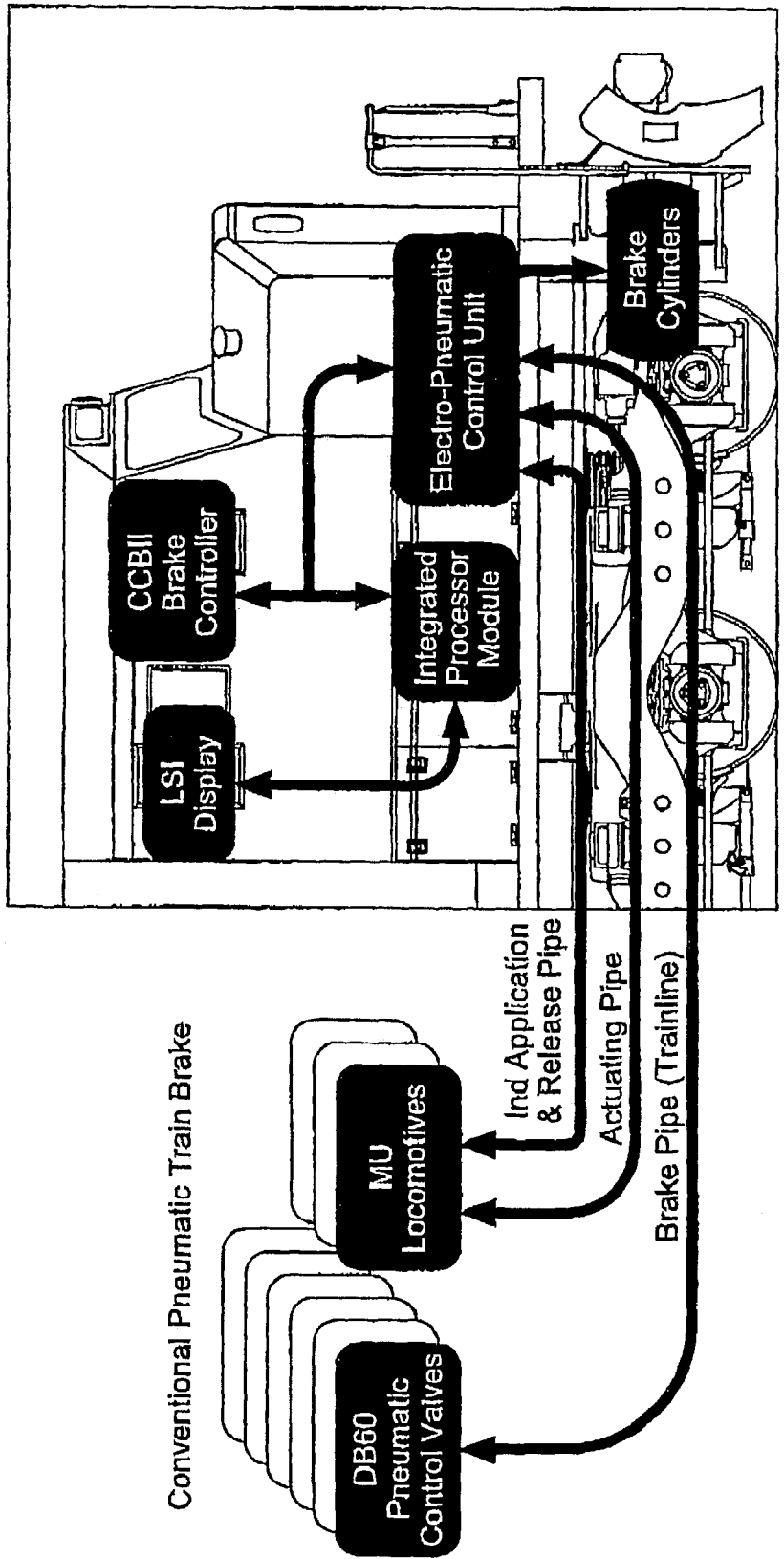
FIG. 3 is a schematic representation of a CCBII brake controller.

The CCBII® brake control system is a network-based, 26L compatible, electro-pneumatic air brake system designed for main line freight and passenger locomotives. FIG. 3 depicts the CCBII architecture.

The CCBII system consists of three primary components. They are the Electronic Brake Valve (EBV), the Integrated Processor Module (IPM), and the Electro-Pneumatic Control Unit (EPCU). The EBV provides the man-machine interface to the automatic and independent brake controls. The automatic handle controls the automatic (train) brake and the independent handle controls the independent (locomotive) brake. The IPM is the brake system's central computer. The IPM manages the electronic interfaces between the brake system and the Locomotive Engineer's display, other locomotive on-board sub-systems (i.e. alerter, cab signal, etc.) and general locomotive inputs and outputs. The EPCU manages the locomotive pneumatic interfaces. These interfaces include the locomotive's brake cylinders, brake pipe, independent application and release pipe, and the actuating pipe. CCBII System is described in U.S. Pat. No. 6,098,006 to Sherwood, et al.

Wired Distributed Power System

Figure 4:
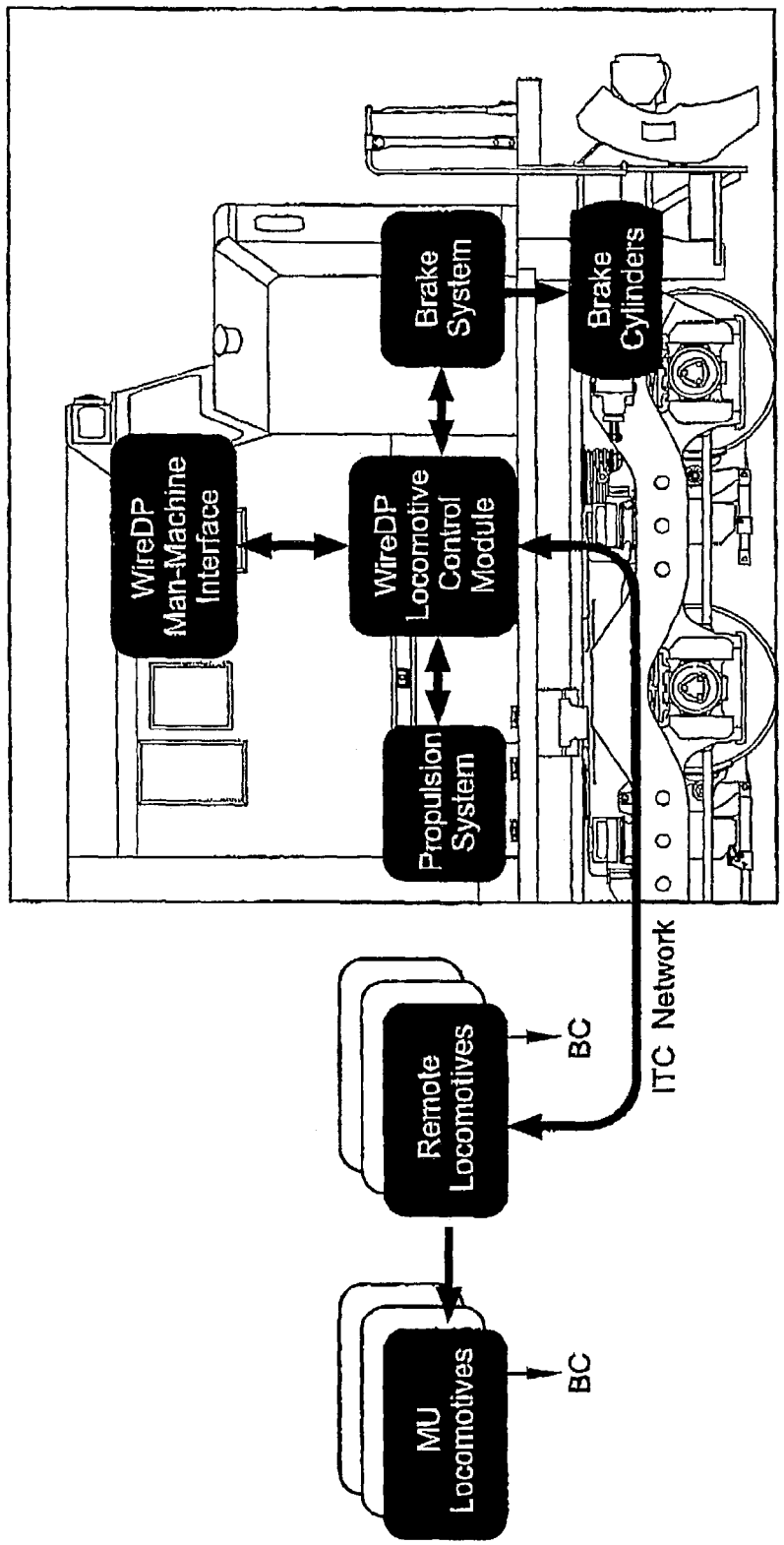
FIG. 4 shows a schematic representation of a wire distributive power system.

The Wired Distributed Power (WDP) system is a remote locomotive control system, which utilizes the ITC network as the communications medium, as shown in FIG. 4. This is the same communications network as used by the EP-60® (cable based) system. Utilizing the wire technology to replace the traditional radio as the communication medium provides a more reliable link to the remote locomotives. WDP takes advantage of the already established EP-60 brake control system for head of train to end of train beacons to provide trainline brake control and to verify the trainline integrity.

The Locomotive Engineer is provided the ability to control multiple remote locomotives located remotely in the train. The designation "remote unit" applies to the controlling locomotive unit in a remote locomotive consist. Remote consists are located in different parts of the train and are controlled by commands from the lead locomotive. Locomotives connected through the MU lines for multiple unit service (lead or remote unit) are called trail locomotives. FIG. 4 depicts the WDP system architecture.

The remote locomotive can be controlled synchronous (MU operation) to the lead locomotive or independent of the lead locomotive. Independent operation can be further divided into individual or group control of locomotives. The WDP provides the capability to control the remote locomotive air brake, throttle, dynamic brake, auxiliary controls, and critical monitoring functions.

The WDP system's primary component is the Locomotive Control Module (LCM). The LCM is an intelligent device that interfaces with the existing on-board locomotive sub-systems (i.e. brake, propulsion, etc.). The LCM provides the ability to control locomotives not connected directly in consist in a similar manner as in multiple unit (MU) operation. The LCM provides the mean to control these remote units by managing the command signals transmitted via the ITC Network. The primary LCM responsibilities to provide the man-machine interface to control and monitor remote locomotives and to provide the interface to the locomotive sub-systems.

Smart Car

Smart Car applies on-car sensors and/or actuators to freight railway cars for the purpose of providing defect detection, monitoring of car operating status, car location tracking and automated car sub-system control.

Early detection/correction of failures or impending failures provides a distinct advantage to railroads, car builders and shippers by helping to prevent equipment damage, lading damage and derailments. The Locomotive Engineer and/or other personnel can be notified immediately of car defects such as a hot bearing, flat-wheel or wheel off-rail. Other operating parameters can be monitored, recorded and/or reported for the purpose of determining car equipment performance. With the addition of GPS, the location of the car can be tracked at any time. In addition to sensing functions, Smart Car also provides the capability of controlling car level functions such as automated handbrake and dumper control.

The Smart Car system includes a power source, central intelligence and communications interface such as radio, satellite link or the wire-based ITC network. Depending on the level of functionality desired, a number of sensors and/or actuators can be added to the base system.

Smart Car provides the following informational benefits:
Car Diagnostics
   Stuck Handbrake Detection
   Hot Bearing Detection
   Off-Rail Detection
   Bad Wheel Detection
   Slack Adjuster Failure
Car Operational/Status Monitoring
   Car Load
   Braking Effort
   Draw Bar/Draft Gear Force
   Impact Detection
   Refrigeration System Monitoring
   Door, Hatch And Gate Position Monitoring
Car Location Smart Car provides the following performance benefits:
Automated Control
Auto Engage/Disengage of Handbrake
Auto Door, Hatch And Gate Actuation LEADER® System The LEADER® System is a real-time data collection, processing, storage and reporting system. The power of LEADER System lies in its ability to collect all data necessary to create a real-time, animated display of train dynamics in the cab for the Locomotive Engineer. Leader also provides the ability to recreate any run ever made for general or detailed post-analysis.

Figure 5:
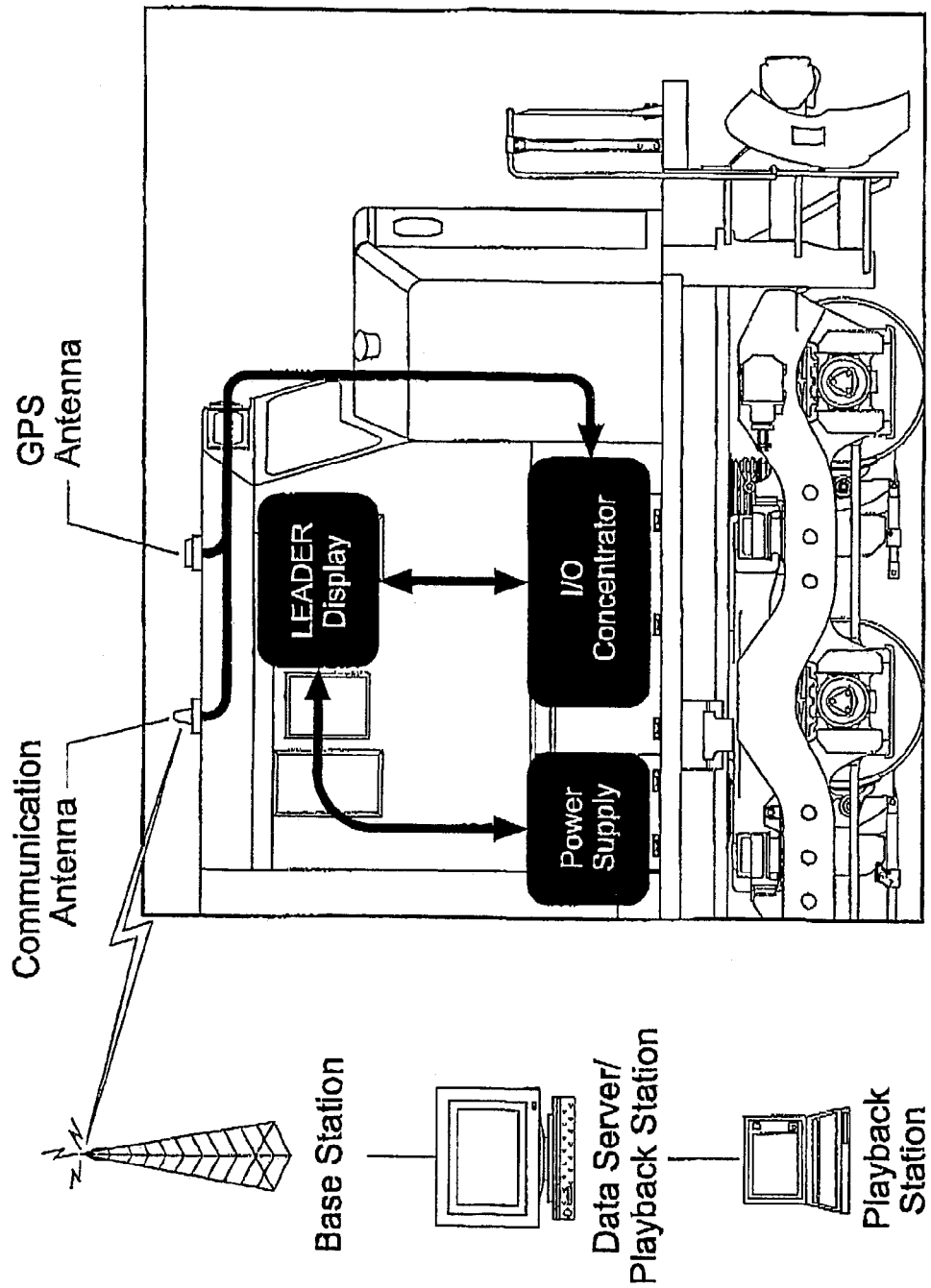
FIG. 5 shows a schematic representation of a LEADER system.

LEADER System is a powerful new in-cab instrument, capable of providing detailed feedback to the Locomotive Engineer. Graphical, animated train dynamics are shown in real time. A view of the track profile two to nine miles ahead of current location is displayed. The Locomotive Engineer now knows the current state of the train; grades and curves occupied, slack state of the couples, air brake status, speed, acceleration, position, and what to expect over the next few miles, all with a single glance. By making subtle changes in train-handling technique through the LEADER Display, significant performance improvements are achieved. FIG. 5 depicts the LEADER system architecture.

The LEADER System consists of on and off-board equipment. Onboard, the LEADER Display is a flat panel Liquid Crystal Display (LCD) containing a Single Board Computer (SBC) and communication electronics. The display is the interface for the Locomotive Engineer providing a touch screen display and key board for input. The I/O Concentrator is a modified, enhanced event recorder which collects and reports sensor data to the SBC. The system includes a GPS System and a Radio Communication System whose antenna are installed on the roof of the locomotive. The power supply conditions the raw 74 volt battery power for the display.

Off-board, the Base Station acts as a Data Server collecting and storing log files from the locomotive and a Playback Station providing a terminal for analysis. The Base Station includes a data radio for communication with the locomotives and is generally located at a fixed position. The Portable Playback Stations are laptop computers with playback capability and generally access log files through a LAN or via cable onboard the locomotive.

Figure 6:
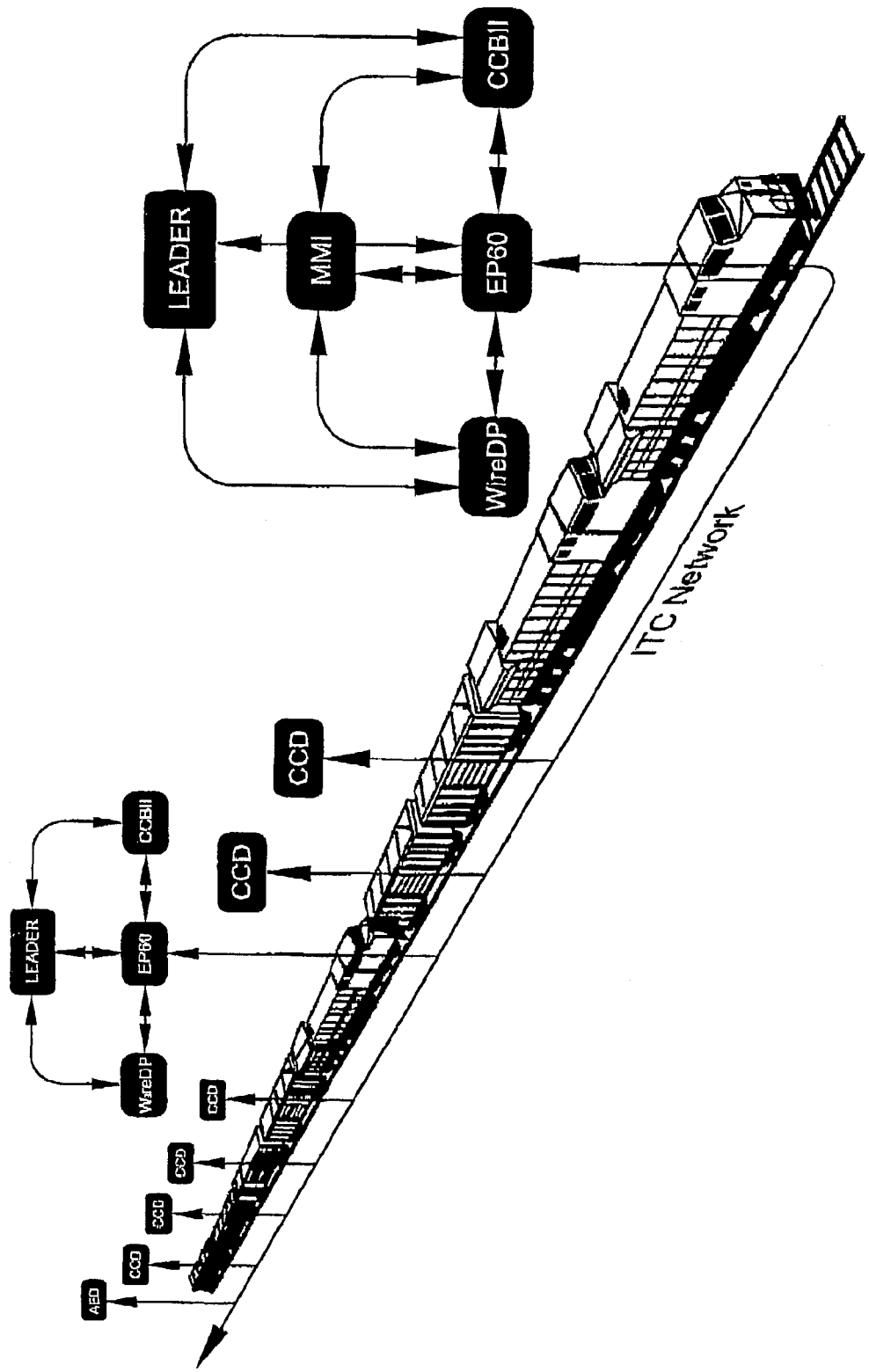
FIG. 6 shows a schematic representation of the integrated train controller according to the principles of the present invention.

The LEADER system provides the following informational benefits:
Detailed, Real-Time View To Train Dynamics
   Currently Occupied Grades And Curves
   Slack State Of All Couplers In Train
   Air Brake Status Of Train
   Speed, Acceleration, And Position Of Train
Complete Recording And Storage Of All Data Necessary To Recreate Any Run At Any Time
Automatic Radio Download Of Log Files For Analysis
Automatic Or Manual Operational Analysis Proactive Exception Reporting Via E-Mail
Flexible User Interface To Customize Analysis
  By Segment
  By Dates
  By Engineer
  By Exception
  Or By Any Combination Of The Above
Asset Tracking
Precise On-Board Tracking Of Locomotive Location
Equipment Malfunction Alerts Integrated Train Control As illustrated in FIG. 6, The EP-60® system provides the platform for building a complete integrated train control and information system. With the advent of ECP brakes comes the key to train level systems integration via the ITC network. Until ECP braking emerged, the focus on systems integration has been primarily at the locomotive level. The ECP based ITC network forms the backbone for enabling both car and locomotive systems to operate together to provide enhanced train wide information and performance benefits. The EP-60 system provides the backbone for the communications network and intelligent train braking as the initial building block to achieve integrated train control. The following features of the EP-60 system provide valued benefits to be built upon for additional levels of system integration.

Intra-Train Communications Network—The ITC network provides the communications path for the addition of Wired Distributed Power, Smart Car and LEADER® System.

Intelligent Car Level Braking—This provides the basis for improved braking performance with the addition of Smart Car sensing for real-time feedback of car operating conditions and LEADER System for better train handling.

Automatic Train Consist Identification—When the train is initialized, the EP-60 Head End Unit establishes a train consist database which contains information on each car and locomotive such as reporting mark, vehicle length, vehicle weight and other parameters. This information is available for Wired Distributed Power, LEADER System and other systems.

Vehicle Sequencing and Orientation—During train initialization, the EP-60 system also establishes the sequence and orientation of each vehicle in the train. This information is provided to the WDP system for automating the setup process and to LEADER System for automated train control.

External Sensor Interface—The EP-60 Car Control Device provides a local power and communications network interface which provides for add-on capability of Smart Car The addition of CCBII® System to the EP-60® system provides the added benefit of a shared man-machine interface and pneumatic brake control. The integrated system provides single handle control of the ECP trainline and pneumatic brake pipe via the CCBII electronic brake valve. The integrated package also combines the system feedback, set-up functions and diagnostic logging via a common operator display module. Additionally, the CCBII interprets the ECP trainline brake command to control the locomotive brake cylinder pressure locally. By combining an EP-60 TCC and TPS with a CCBII conventional brake control system, a locomotive can be fitted for "Dual Mode" ECP and conventional pneumatic train and locomotive brake control.

The system architecture uses a direct communications link between the EP-60 and CCBII systems. This link manages the complete brake control interface between the two systems. Separate (LSI) communication links are provided to interface the EP-60 and CCBII systems to the ILC System for setup, system status, and event/diagnostic logs.

The integrated system shares functional responsibilities between the EP-60 and CCBII Systems. The system architecture establishes the CCBII system as the brake control interface layer to the locomotive and operator. The CCBII system manages all high level brake control inputs and local brake control outputs to the locomotive, as well as, charging the brake pipe and handling any locomotive application specific requirement. The EP-60 System manages the core ECP trainline control functionality as governed by the American Association of Railroads (AAR). The integrated system provides the capability to command trainline service, penalty and emergency brake applications while maintaining a fully charged brake pipe. To control the locomotive brake cylinder pressure in response to the ECP trainline brake command, the integrated system has the capability to read the ITC trainline directly. In addition, CCBII System modulates the independent application and release pipe pressure in response to the ECP trainline command to control the brake cylinder pressure on non-ECP equipped trailing (MU) locomotives.

As a result, the added benefits of the integrating the CCBII with the EP-60 system include, The shared integration of the Man-Machine Interface minimizes the brake control operational differences when in ECP and conventional pneumatic mode.

The EP-60 and CCBII Systems share common locomotive inputs and outputs, which eliminate installation requirements for dual wiring and piping to both systems.

Locomotive brake cylinder control is provided without additional control valves for ECP equipped lead locomotives and non-ECP equipped trail locomotive.

The system easily transitions from pneumatic trainline brake pipe reductions for service, penalty and emergency brake applications to ECP electronic commands when ECP mode is selected.

The addition of Wired Distributed Power (WDP) to the EP-60® and CCBII® systems provide the added benefit of controlling remote locomotives via the ITC network. By using the already established ITC/ECP trainline communications and brake platform, the complexity of adding distributed power is significantly reduced. This results in increased communications reliability and performance, as compared to other forms of communications. The WDP system shares functional responsibilities with the EP-60 and CCBII Systems. The system architecture establishes the WDP system as the high level remote locomotive controller for both brake and propulsion. The WDP system manages all high level remote locomotive commands, set-up and information feedback. The WDP system relies on the EP-60/CBII system to provide the brake control and ITC network communications management. Issues such as communications loss and End-Of Train (EOT) terminations are handled by the EP-60 System reducing the WDP functional requirements. The EP-60 train make-up and sequencing process provides an automated means to identify pertinent locomotive information (such as locomotive type, location and direction) significantly reducing manual DP set-up requirements.

The system architecture utilizes a direct communications link between the EP-60 and Wired DP systems. This link handles the interaction of remote locomotive brake control, as well as providing the DP gateway to the ITC network. Separate (LSI) communication links are provided for the EP-60 and WDP systems to the ILC System for system set-up, system status, and event/diagnostic logging.

By integrating WDP with EP-60/CCBII Systems, a fully integrated platform for complete train control and information is established. The ITC network provides the gateway necessary for the introduction of additional intelligent systems to improve overall train control performance and management. Systems such as LEADER System and Smart Car are now possible, where communications to all cars and locomotives is essential.

As a result, the added benefits of integrating the Wired DP with the EP-60/CCBII system include, Utilization of the EP-60 trainline communications controller.

Shared brake control functional responsibilities reduce implementation complexity.

Establish a train wide communication network to each locomotive and rail car for propulsion and brake control and information in combination with LEADER System.

Several advantages are achieved when the Smart Car system is integrated into an EP-60® equipped rail car. The key advantages are the elimination of an on-board power source, improved brake control with electronic on-car load sensing and brake effort monitoring, captive communications to the lead locomotive via the ITC network and increased intelligence/decision making capability through the combination of ECP car control electronics, Smart Car equipment and locomotive equipment.

The Smart Car system interfaces to the EP-60 Car Control Device (CCD) for communications and power. The CCD includes an intelligent power management function for controlling power for brake control and Smart Car functions. It also includes a local communication network interface, which provides the gateway to the ITC network. This allows for the transmission of exception reports and other important car operating information to the lead locomotive and Locomotive Engineer. In addition, transmitting commands from the lead locomotive can provide features such as automated hand brake and dumper control. Integrating Smart Car with EP-60 System also provides additional braking performance capability with the addition of electronic load sensing and/or brake effort monitoring. The CCD can use this information to adjust the local brake control of the car to achieve the desired brake rates. In addition, operating parameters such as actual car weight, car brake effort and draw bar/draft gear force provides information to the lead locomotive that can be used for achieving better train control.

LEADER® System adds the intelligence to each individual system to arrive at Integrated Train Control. With LEADER System, the integrated system will know the dynamic state of the train at each instant in time including location, slack state, propulsion system status and brake systems status. What's more, LEADER System has the ability to look ahead and create what-if scenarios, searching for the best course of action to achieve the railroad's goals.

Train control decisions can be made on a car by car and locomotive-by-locomotive basis. LEADER can calculate a brake setting for each car based on the geography of the situation keeping the train stretched or bunched to dramatically reduce, nearly eliminating in-train forces. Train-handling challenges are greatest when the train is experiences multiple grade change points across the train's length. In these situations, the best strategy is to apply brake effort only on the cars which require brake to maintain a stretch or bunch condition. LEADER System uses sophisticated algorithms to determine which cars should brake and EP-60® System provides the technology to make it happen, car-by-car.

Similarly, independent control of remote locomotives inherently provides for the best control to move today's long trains. By understanding the current geography of the train and what grades lie ahead, LEADER System will calculate the throttle setting to smoothly, efficiently vary the power settings on each locomotive to optimize train-handling. The ITC network provides the communication medium to the remote locomotives and Wired Distributed Power provides the actuator to make it happen.

LEADER System acts as both a man-machine-interface platform and a communication platform for Smart Car. Smart Car reports status and exception information to the ITC network, which is forwarded to LEADER. The LEADER System brings the issue to the attention of the Locomotive Engineer and provides a recommended course of action based on its complete knowledge of the state of the train. All Smart Car reports are also included in the LEADER log file such that when the log file is reported to the Base Station, the Smart Car alert is brought to the attention of the appropriate individual via e-mail.

Much as in conventional pneumatic brake systems, LEADER System allows the Locomotive Engineer to better understand the state of the pneumatic brake system controlled by CCBII® System and therefore make better, safer braking decisions. LEADER System provides information about the charged state of the brake system, knows how much retarding force is available from the system and can make recommendations on brake settings. And because CCBII System is electronic based, LEADER System can make a direct communication link and issue commands to achieve a desired goal.

The CCBII System is an electropneumatic brake controller controlling the brake pipe and providing electropneumatic brake signals. The wire distributive power system includes a propulsion controller which provides electrical propulsion signals. An operator interface is the control stand which is connected to the brake controller and the propulsion controller. The CCD is an example of an electropneumatic brake system in the cars of the train that are connected to the trainline and the brake pipe. Additional locomotives include propulsion systems on the locomotives connected to the trainline in the wired distributive power system. LEADER System is an example of a master controller which determines the conditions for each car and locomotive of the train and as a function of the determined condition, it transmits over the trainline individualized brake signals to each car and locomotive and individualized propulsion signals to each locomotive.

Further novel features are described in the appended claims.

Although the particular products of New York Air Brake Corporation are mentioned herein, equivalent products by competitors may also be used in the integrated train control system.

The invention claimed is:

1. An integrated train control system on a train which includes at least one locomotive and a plurality of cars, the system comprising:
   a wire trainline and brake pipe extending through each car and locomotive on the train;
   electropneumatic brake controller controlling the brake pipe and providing electropneumatic brake signals;
   a propulsion controller providing electrical propulsion signals;
   an operator interface connected to the brake controller and the propulsion controller;
   an electropneumatic brake system in cars in the train and connected to the trainline and brake pipe;
   propulsion systems on locomotives in the train and connected to the trainline; and
   a master controller which determines conditions for each car and locomotives in the train and as a function of the determined conditions transmits over the trainline individualized brake signals to each car and locomotive and individualized propulsion signal to each locomotive.

2. The system according to claim 1, wherein the master controller determines the location of each car and locomotive on a track profile and determines the conditions of the cars and locomotives from the position on the track profile.

3. The system according to claim 2, wherein the master controller determines anticipated conditions of each car and locomotive based on upcoming track profiles and individualizes the transmitted signals as a function of the anticipated conditions.

4. The system according to claim 1, wherein the brake controller and the propulsion controller each includes at least one sensor and the brake controller and the propulsion controller determine the conditions from the sensor and transmits the determined conditions to the master controller.

5. The system according to claim 4, wherein the determined conditions are one or more of hot bearings, stuck hand brakes, flat wheel and wheel off-rail.

6. The system according to claim 4, wherein the determined conditions include one or more of car load, braking effort, drawbar/draft gear forces and impact detection.

7. The system according to claim 6, wherein the brake controller uses the local determined conditions for controlling the local brakes.

8. The system according to claim 1, wherein the car and locomotive include auxiliary equipment connected to the brake controller and propulsion controller and the master controller transmits individual control signals for the auxiliary equipment.

* * * * *